United States Patent

Krautzig et al.

[11] Patent Number: 6,093,902
[45] Date of Patent: Jul. 25, 2000

[54] METHOD OF MAKING A RECESS TERMINATION IN A COMPONENT

[75] Inventors: Joachim Krautzig, Widen; Uy-Liem Nguyen, Baden-Dättwil, both of Switzerland

[73] Assignee: ABB Alstom Power (Switzerland) Ltd, Baden, Switzerland

[21] Appl. No.: 09/210,742

[22] Filed: Dec. 15, 1998

[30] Foreign Application Priority Data

Dec. 22, 1997 [EP] European Pat. Off. ............ 97 811 009

[51] Int. Cl.[7] ................................. B23P 6/04; B23H 7/02
[52] U.S. Cl. ..................................... 219/69.17; 219/69.12
[58] Field of Search .............................. 219/69.12, 69.17, 219/69.15; 225/1, 2

[56] References Cited

U.S. PATENT DOCUMENTS

| | | |
|---|---|---|
| 4,383,556 | 5/1983 | Evgenievich et al. . |
| 4,682,632 | 7/1987 | Wiedenhoff . |
| 4,711,387 | 12/1987 | Paton et al. . |

FOREIGN PATENT DOCUMENTS

| | | |
|---|---|---|
| 1181844A | 9/1985 | U.S.S.R. . |
| 1500458A1 | 8/1989 | U.S.S.R. . |
| 1613293A2 | 12/1990 | U.S.S.R. . |
| 1376731 | 12/1974 | United Kingdom . |

*Primary Examiner*—Geoffrey S. Evans
*Attorney, Agent, or Firm*—Burns, Doane, Swecker & Mathis, L.L.P.

[57] ABSTRACT

In a method of making a recess termination in a component, the recess (2) extending with its tip (4) from the surface (3) of a wall (1) of the component into the interior of the wall (1), the tip (4) of the recess (2) is deflected in its direction by at least about 180° relative to the main extension direction of the recess (2), the deflection being effected in a curvature (6) which is generously dimensioned from the point of view of notch and fracture mechanics, the maximum radius (4) of curvature being placed at the point of maximum stress in the wall (1), the tip (4) of the recess (2) ending in an at least largely relieved region, and the wall piece in the interior of the arc (6) of curvature remaining connected to the rest of the wall (1) via an adequately dimensioned material bridge (5).

4 Claims, 1 Drawing Sheet

METHOD OF MAKING A RECESS TERMINATION IN A COMPONENT

BACKGROUND OF THE INVENTION

1. Field of the Invention

The invention relates to a method of making a recess termination in a component. In this case, the termination of the recess is to be designed in such a way that the latter does not continue to grow despite loading of the component.

2. Discussion of Background

In the construction of machines and apparatus there is often the problem of preventing further growth of a crack which has grown on account of excessive loading or of eliminating crack growth due to the notch effect at the end of a relief slot specifically made in a wall of a component. A known method of the prior art for solving this problem consists in "boring out" the recess, by a hole of sufficiently large bore diameter being drilled at the tip of the crack or slot.

The term recess is intended to refer below to a crack which has grown naturally, to a weakening, crack-directing notch as "predetermined breaking point" which permits crack propagation only in the prescribed direction and causes only a minimum leakage cross section on account of the small opening of a crack which has grown in the remaining wall thickness, or to a slot specifically made in a component.

A considerable leakage cross section, which is undesirable, for example, in fluid-flow machine construction, is disadvantageously produced by the boring out of the recess tip. For this reason and for strength reasons, a bore diameter which is too small to result in a lasting solution to the abovementioned problem is therefore often selected in practice.

On the basis of knowledge gained in the field of fracture mechanics, it is known that, by a suitable run-out of the crack tip, i.e. a suitable configuration of the recess termination, further growth of the crack or the recess can be inhibited or prevented, so that it is possible to continue to use and load the component.

SUMMARY OF THE INVENTION

Accordingly, in attempting to avoid the abovementioned disadvantages of the prior art, one object of the invention is to provide a novel method of making a recess termination in a component, with which method, on the one hand, crack development or further crack growth in the recess is reliably prevented and, on the other hand, no increased leakage occurs.

According to the invention, this is achieved in that, in a method of making a recess termination in a component, the tip of the recess is deflected in its direction by at least about 180° relative to the main extension direction of the recess, the deflection being effected in a curvature which is generously dimensioned from the point of view of notch and fracture mechanics, the maximum radius of curvature being placed at the point of maximum stress in the wall, and the wall piece in the interior of the arc of curvature remaining connected to the rest of the wall via an adequately dimensioned material bridge.

The advantages of the invention consist in the fact that the further growth of an existing crack is prevented or the start of a crack at the end of a slot which is made deliberately is ruled out, so that the component can continue to be stressed without problem. In addition, no large holes are produced in the component by the method according to the invention, so that leakage losses, for example in thermal fluid-flow machines, can be minimized.

It is especially expedient if the curvature is designed in the form of a semicircle up to a three-quarter circle, an ellipse or spiral or similar curve. These forms are especially well suited to prevent an incipient crack or to stop the crack growth.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
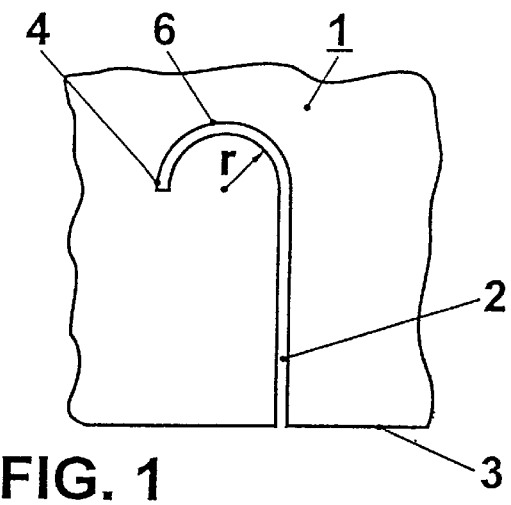
FIG. 1 shows a section through a recess in a first embodiment variant of the invention.

Referring now to the drawings, wherein like reference numerals designate identical or corresponding parts throughout the several views, FIG. 1 shows a section through a recess 2 made specifically in a wall 1. This recess 2 is, for example, a relief slot which has been made in the wall 1 by means of suitable manufacturing processes (e.g. electrical discharge machining). The recess 2 extends from the side edge 3 into the interior of the wall 1 and has a width from typically 3 mm upward.

According to the invention, the termination of the relief slot is now made in such a way that the tip 4 of the recess 2 is deflected in its direction by about 180° relative to the main extension direction of the recess 2, so that the termination of the relief slot 2 is made in the wall 1 in the form of a semicircle having the radius r of curvature. The size of the radius r of the curvature 6 is determined from the point of view of notch and fracture mechanics and is generously dimensioned in order to ensure that an incipient crack or even crack growth does not take place anywhere. In this case, the tip 4 of the relief slot 2 is made in a largely relieved region and positioned there, i.e. it ends in this region.

The configuration of the termination in the individual case depends in the first place on the magnitude of the stresses and in the second place on their direction. In addition, the available space and questions of optimization—greatest possible security against incipient cracks at the smallest possible leakage—are important. A further important aspect is how precisely the magnitude and direction of the loading under all the operating conditions which occur are known or can be calculated in advance.

FIG. 1 shows a more simple form for a case in which stress magnitude and direction are well known.

Further forms of terminations, which may be of advantage in special cases, are shown by way of example in FIG. 2 to FIG. 5.

Figure 2:
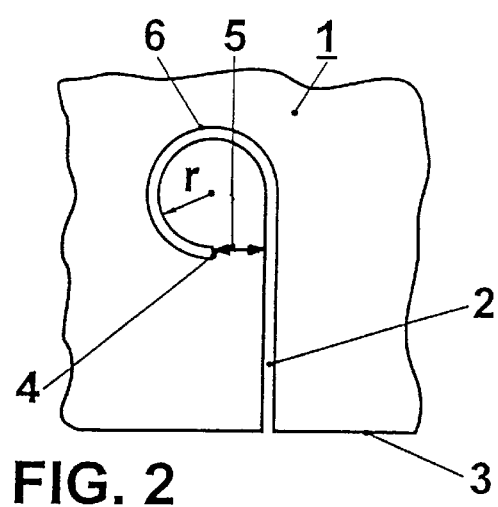
FIG. 2 shows a section through a recess in a second embodiment variant of the invention.

FIG. 2, in contrast to FIG. 1, shows how the tip 4 of the slot 2 is deflected in its direction by more than 180° relative to the main extension direction of the slot 2. In the example, the termination of the recess 2 is designed in the form of a three-quarter circle, and here, too, the tip 4 runs into a largely or completely relieved region and ends there.

Here, as well as in the following examples, the wall piece in the interior of the end arc still remains connected to the rest of the wall via an adequately dimensioned material bridge 5.

Figure 3:
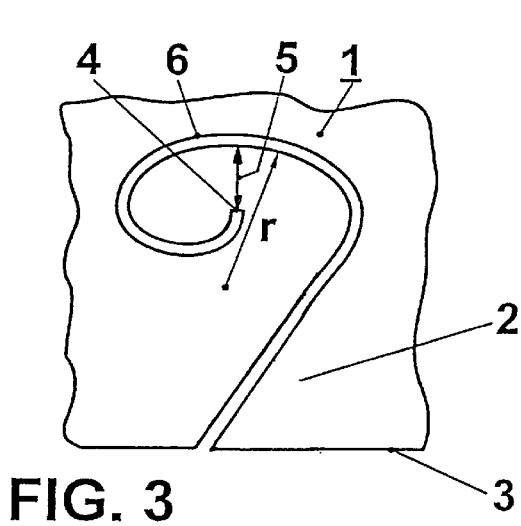
FIG. 3 shows a section through a recess in a third embodiment variant of the invention.
Figure 4:
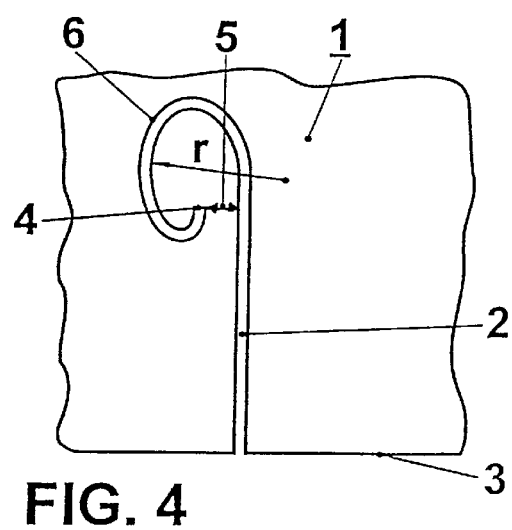
FIG. 4 shows a section through a recess in a fourth embodiment variant of the invention.

FIGS. 3 and 4 show embodiment variants in which the recess termination is designed in the form of a semi-ellipse up to a three-quarter ellipse or a similar curve. Here, the maximum radius r of curvature is in each case placed at the point of maximum stress in the wall, so that the ellipses are accordingly designed to differ in the extent of their width and height. FIG. 3 also shows that the recess 2 need not necessarily extend perpendicularly from the side edge 3 of the wall 1.

Figure 5:
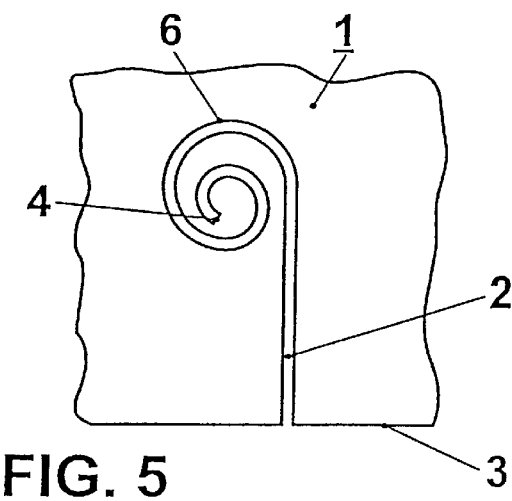
FIG. 5 shows a section through a recess in a fifth embodiment variant of the invention.

Finally, FIG. 5 shows a sectional representation of a recess 2 in a wall 1 in which the recess termination is designed in the form of a spiral. Such a termination provides the greatest possible resistance against crack growth if loading directions which vary at random are to be expected. All the other features of the invention are included as already described above.

The invention is of course not restricted to the exemplary embodiments just described. For example, the recess 2 may be a weakening, crack-directing notch which is deliberately made in the wall, is of a depth of less than the local wall thickness, and ensures that a crack forms only in the prescribed form and propagates with the advantage of a minimum leakage cross section of the crack, which has grown in the remaining wall thickness.

In addition, the recess 2 may, for example, also be a crack which has developed unintentionally as a result of excessive loading or as a result of material defects in the wall 1. In order to prevent further growth of this crack and thus to enable the wall 1 or the component to be stressed for an even longer period, a termination in the form shown above may be made subsequently by suitable manufacturing processes. Alternatively, the termination may be made on the surface as a crack-directing notch, or the crack growth could also be specifically influenced in such a way that the propagation direction of the crack is changed by the selection of suitable stress conditions, so that the crack tip, in relation to the main propagation direction, is turned back by at least about 180° in such a way that a curvature in the form of a semicircle or a three-quarter circle or an ellipse or spiral is obtained as crack termination. In this case, the maximum radius r of curvature, as already described above, should be realized at the point of maximum stress, and the crack tip is made in the wall in such a way that it runs into a largely or completely relieved region, the wall piece in the interior of the end arc remaining connected to the rest of the wall via an adequately dimensioned material bridge.

Obviously, numerous modification and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A method of making a recess termination in a component comprising the steps of:

performing a manufacturing process to make a recess extend to a tip from a side edge of a wall of the component into an interior of the wall, wherein the tip of the recess is deflected by at least about 180° relative to a main extension direction of the recess and the deflection being effected by a curvature of the recess, a maximum radius (r) of the curvature being placed at a point of maximum stress in the wall, the tip of the recess being made in an at least largely relieved region, and a wall piece in the interior of the curvature remaining connected to the rest of the wall via an adequately dimensioned material bridge.

2. The method as claimed in claim 1, wherein the curvature of the recess is designed in the form of a semicircle up to a three-quarter circle.

3. The method as claimed in claim 1, wherein the curvature of the recess is designed in the form of a semi-ellipse up to a three-quarter ellipse.

4. The method as claimed in claim 1, wherein the curvature of the recess is designed in the form of a spiral.

* * * * *